United States Patent [19]

Schminke et al.

[11] 4,017,671
[45] Apr. 12, 1977

[54] PROCESS FOR THE CONTINUOUS MANUFACTURE OF CELLULOSE GLYCOLATE

[75] Inventors: Wolfgang Schminke; Klaus Stölting; Hans Macholdt; Hans Künkler, all of Wiesbaden-Biebrich, Germany

[73] Assignee: Hoechst Aktiengesellschaft, Germany

[22] Filed: Jan. 6, 1975

[21] Appl. No.: 539,035

[30] Foreign Application Priority Data

Jan. 9, 1974  Germany ............... 2400879

[52] U.S. Cl. ............................... 536/98
[51] Int. Cl.² ............................... C08B 11/00
[58] Field of Search ........... 260/231 CM, 233; 536/98

[56] References Cited

UNITED STATES PATENTS

| | | | |
|---|---|---|---|
| 2,512,338 | 6/1950 | Klug et al. | 260/231 CM |
| 2,517,577 | 8/1950 | Klug et al. | 260/231 CM |
| 3,088,943 | 5/1963 | Cordrey et al. | 260/231 CM |
| 3,498,971 | 3/1970 | Blaga et al. | 260/231 CM |
| 3,678,031 | 7/1972 | Schoggen | 260/231 CM |
| 3,857,833 | 12/1974 | Warzecha et al. | 260/233 |
| 3,900,463 | 8/1975 | Yada et al. | 260/231 CM |

*Primary Examiner*—Ronald W. Griffin
*Attorney, Agent, or Firm*—James E. Bryan

[57] ABSTRACT

In the manufacture of cellulose glycolate, a reaction mixture comprising per 1 part by weight of cellulose 0.2 to 0.6 part by weight of sodium hydroxide, 0.5 to 1.75 parts by weight of sodium monochloroacetate, 7 to 22 parts by weight of isopropanol, and from 20% to 50% by weight, based on the weight of isopropanol, of water is subjected to shearing forces at a temperature less than 30° C to effect intimate mixing and then reacted to cause etherification of the cellulose in a reaction area held at a temperature in the range of 60° C to 90° C and held constant within each section of the reaction area. The residence time of the mixture in the mixing zone is at most one-tenth of its residence time in the reaction area. The solid and liquid components of the reaction mixture after etherification are separated mechanically.

5 Claims, 1 Drawing Figure

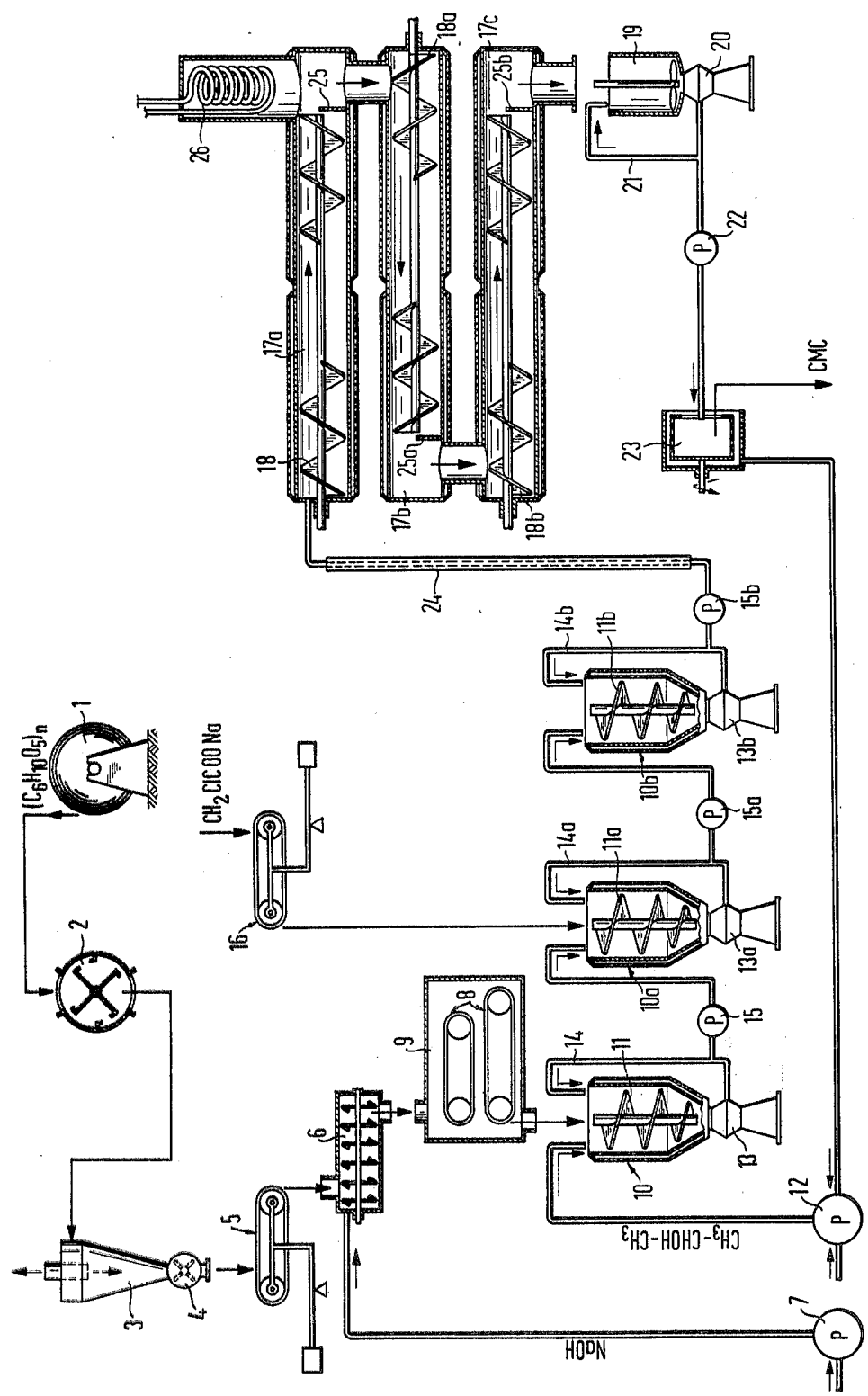

PROCESS FOR THE CONTINUOUS MANUFACTURE OF CELLULOSE GLYCOLATE

The invention relates to a process for the continuous manufacture of cellulose glycolate.

In the continuous manufacture of cellulose glycolate it is difficult to obtain a high quality product, particularly a product having a very uniform degree of substitution, even when the reaction times are very short. It is known to knead thoroughly or to press together the etherification mixture during the process of etherification, in order to mix the etherification agent intimately with the alkali cellulose using the shearing forces which result. However, the application of intensive mixing, kneading or pressing also produces an etherification product which is still not satisfactory, especially as far as its properties of solubility are concerned.

The present invention concerns a process, which may be carried out continuously, for the manufacture of sodium carboxymethylcellulose, which process leads, during a relatively short reaction time, to an end product with good solubility. A process for the continuous manufacture of cellulose glycolate is used in which an etherification mixture, initially containing alkali cellulose formed from finely comminuted cellulose and sodium hydroxide solution, sodium chloroacetate and water is conveyed through a reaction area having a constant temperature of at least 60° C or, if the area has more than one section, a constant temperature in each section, in such a manner that the residence time of the etherification mixture in the reaction area is sufficient to cause the sodium chloroacetate initially contained in the mixture to react, and in which the etherification mixture is also thoroughly mixed by applying shearing forces.

According to the invention the etherification mixture initially comprises 1 part by weight of cellulose 0.2 to 0.6 part by weight of sodium hydroxide 0.5 to 1.75 part by weight of sodium monochloroacetate 7 to 22 parts by weight of isopropyl alcohol (100% strength) and water corresponding to between 20% and 50% by weight of the isopropyl alcohol, the constant temperatures of the etherification mixture in the reaction area are maintained in the range of from 60° to 90° C, preferably 70° to 85° C, the shearing forces are exerted on the etherification mixture before it enters the reaction area and at temperature of below 30° C, by homogenizing by means of a homogenizer, the residence time of the etherification mixture in the homogenizing zone is less than 1/10 of its residence time in the reaction area and that after etherification has terminated the fluid components are more or less completely separated from the solid components of the etherification mixture by mechanical means.

As the quality of the products obtained is better the more intensive the homogenization of the etherification mixture before it enters the reaction area, it is desirable to circulate the etherification mixture several times through the homogenizer, advantageously at least 10 times on average. Accordingly the etherification mixture is desirably allowed to run through the homogenizer at a speed which is at least 10 times the speed (quantity per unit of time) at which it is conveyed through the reaction area, wherein the excess etherification mixture running through the homogenizer is recirculated. The homogenization of the etherification mixture is more nearly complete if the etherification mixture is allowed to run through two consecutively arranged homogenizers inclusive of the circulatory movement before it enters the reaction area, and it is advantageous to proceed in this manner.

The process has a few unusual features. Although the above mentioned initial composition of the etherification mixture may be in part known per se, these are in processes in which shearing forces are not applied to the etherification mixture. It is one of the unusual features of the process according to the invention that an etherification mixture is used which has been diluted by a relatively large amount of diluent (isopropanol), although shearing forces are to be exerted intensively. All the previous processes in which an improvement of the product has been aimed at through the effect of mechanical forces have provided relatively small amounts of liquid in their etherification mixtures for obvious reasons. Another unusual feature of the process is that the shearing forces are exerted before the etherification reaction, in contrast with the previous arrangement, in which they must be allowed to act during the etherification reaction. A further feature of the process is that the residence time of the etherification mixture in the homogenizing zone is restricted to a short time in relation to its residence time in the reaction area.

The residence time in the homogenizing zone means that period of time which the etherification mixture spends as it passes through the homogenizer(s) in the zone occupied by the homogenizing tools. The homogenizing tools may be, for example, perforated discs, studded discs or toothed discs of homogenizing mills. The residence time in the homogenizing zone is shorter the smaller the working capacity of the homogenizers. The requirement for a short residence time in the homogenizing zone is therefore easy to fulfil. Homogenizers having as small a working capacity as possible are preferably chosen, as long as their homogenizing efficiency is not impaired by this.

The above-mentioned initial composition mentions only the essential components in one form or another. Thus, for example, the cellulose and a considerable part of the sodium hydroxide are of course present as alkali cellulose, and so, for example, in the manufacture of the etherification mixture, chloroacetic acid and a corresponding amount of sodium hydroxide may have been used in place of sodium monochloroacetate. To manufacture the etherification mixture sodium hydroxide solution with a minimum concentration of 24% by weight is advantageously used. It is, however, preferable to use sodium hydroxide solution with a concentration of about 50% by weight, although solutions with an even higher concentration, for example 60% by weight, may be used effectively. Isopropyl alcohol can be used at 100% strength. However, the technical quality is conveniently used which has about 13% by weight of water, in which case it is preferred to use the sodium hydroxide solution in a concentration of at least 50% by weight. The monochloroacetate component is used mostly in the form of a sodium salt. The salt can then serve in its dry state for the preparation of the etherification mixture. If monochloroacetic acid is used and a corresponding amount of sodium hydroxide solution, then the former is expediently used in the form of an approximately 80% by weight aqueous solution.

One of the advantages of the invention is that recovery and re-use of the isopropyl alcohol used are particularly easy. The fluid components of the etherification mixture which have been mechanically seperated i.e. by filtration, decanting or by centrifugal force from the solid components after etherification contain aqueous isopropyl alcohol having a water content such that it can advantageously be used for the manufacture of the initial etherification mixture directly, that is without intermediate treatment, i.e. without distillation or other purification which is not purely mechanical.

The invention will now be further described, by way of example only, with reference to the attached drawing, which is a schematic representation of a plant for carrying out the process. Cellulose is taken from a supply roller 1 and enters a mill 2, where it is comminuted to an average fiber length of less than 1 mm, preferably of less than 0.4 mm. The comminuted cellulose is then pneumatically transported, deposited in a cyclone 3 and from there reaches via a honey comb sluice 4 by means of a metering conveyer type weigher 5 the alkalising mixer 6, where it is mixed with the sodium hydroxide solution delivered by means of a metering pump 7.

The alkalized cellulose runs onto conveyer belts 8 through a ripening chamber 9 where the cellulose molecules are degraded to the desired average degree of polymerization. The ripened alkali cellulose then enters a stirring vessel 10 in which it is stirred intensively and thoroughly mixed by a vertical screw spindle stirrer 11. At the same time isopropanol (87% strength) is metered into the stirring vessel 10 by a metering pump 12. At the base of the stirring vessel 10 there is a homogenizing device 13. The alkali cellulose pulp passes through this into a circulatory pipe 14 of the stirring vessel; the pulp is pumped round 10 to 100 times and thereby intensively mixed.

One part (1/10 or less) of the alkali cellulose pulp is extracted from the circulatory pipe 14 and is conveyed by a dosing pump 15 to a second stirring vessel 10a also having a screw spindle stirrer 11a, a homogenizing device 13a and a circulatory pipe 14a. Powdered sodium monochloroacetate or about 80% strength monochloroacetic acid is metered into the second stirring vessel 10a in a suitable way by means of a metering conveyer type weigher 16.

Part of the etherification mixture being pumped through is extracted from the circulatory pipe 14a of the second stirring vessel and conveyed by a dosing pump 15a into a third stirring vessel 10b which is equipped with a screw spindle stirrer 11b, a homogenizing device 13b and a circulatory pipe 14b. From the circulatory pipe 14b part of the stream is conveyed by means of a dosing pump 15b into a reaction area 17 comprising three tubes 17a, 17b, and 17c through which the stream is conveyed by means of conveyer spirals 18, 18a and 18b. For the purpose of comminution the reaction mixture leaving the last reaction chamber 17c passes several times through a beating vessel 19 which has a homogenizing device 20 and a circulatory pipe 21. A part of the reaction mixture is extracted from the circulatory pipe 21, conveyed by means of a metering pump 22 into a separating device, for example a centrifuge 23, where the crude product is freed from aqueous isopropanol. The centrifuged isopropanol may be conveyed directly back to the metering pump 12 for re-use.

The further purification of the crude product is carried out in accordance with methods known per se. The etherification mixture should be brought to the desired etherification temperature as quickly as possible.

Preferably, a heating unit 24 is provided in the path to the reaction area 17a. The reaction is carried out at a constant etherification temperature of 60°–90° C, preferably 70° to 85° C. The temperature does not invariably need to be kept constant in the etherification area. It is sometimes advantageous to divide the reaction area into sections having different temperatures. In each of the sections of the reaction area the temperature is, however, to be kept constant. All areas in which the etherification reaction occurs in the etherification mixture at a temperature of from 60°–90° C are together regarded as the reaction area in the present invention.

The residence time of the etherification mixture in the reaction tubes may be regulated by the speed of rotation of the corresponding spiral. The spirals may be provided with certain fittings, such as for example lifting paddles or the like, to achieve an improved mixing effect. In the same way the incline and the pitch of the spirals are accordingly adapted to the special requirements.

To prevent the etherification mixture from running out of the reaction tubes, even if they are only partly filled, there is arranged a suitable weir 25, 25a, and 25b at the end of each reaction tube. The etherification mixture is conveyed through the spirals over the weirs, which come about half way up the tube. The mixture falls freely into the following reaction tube, or, if it has passed through the last tube, falls into the beating vessel. However, the reaction tube may also be completely filled with the reaction mixture during the process. They are then expediently provided with a vapor dome (26) to catch the isopropanol/water mixture evaporated from the etherification mixture and to return it by reflux cooling into the tube. The weirs are superfluous when the process is carried out in this manner.

The reaction area may of course be constructed differently; for example it may consist of only one tube.

The manufacture of the etherification mixture may be carried out by feeding all the reactants into one mixing vessel. It is also possible, as described previously, for the alkalization to be carried out first, and the etherification agents added in a second stirring vessel. A prealkalization without the addition of a solvent in a normal, continuously operating mixer, followed by beating in the mashing vessel as described above is also possible. All processes may be carried out continuously.

If desired, the cellulose mixture can be degraded to lower degrees of polymerisation in the first reaction pipe in addition to the etherification reaction therein, for example by the use of oxidizing agents. Likewise a similar degrading may be carried out in the third pipe optionnally after the etherification in the second reaction pipe has been completed. The process according to the invention progresses quickly and in addition produces a good quality cellulose ether.

In the following examples all the parts are parts by weight and the percentages refer to percent by weight.

EXAMPLE 1

15 parts of ground beech sulphite cellulose, having an average fiber length of less than 0.4 mm, together with 30.9 parts of 23.8% strength aqueous sodium hydroxide solution, 20.3 parts of sodium monochloroacetate and 180 parts of isopropanol are continuously fed into the first of the three mashing vessels 10, 10a and 10b every hour. The average residence time of the reaction mixture in each mashing vessel is approximately 40 minutes. During the stage between the homogenising tools in the homogenisers 13, 13a and 13b a fraction of a second is lost at every passage. The number of passages amounts to approximately 100 to 150. The mixture is continuously extracted from the last mashing vessel 10b and conveyed to the reaction tube 17a, where the etherification mixture is immediately heated to 80° C and the etherification process is effected at a constant temperature.

The average residence time in each reaction tube is about 20 minutes. The crude CMC suspension is continuously discharged and beaten in a beating vessel and the solids are separated from the fluid in, for example, a sieve-worm-centrifuge, or in a decanter. After purification the CMC thus obtained has a DS value (degree of substitution) of 1.22, and a viscosity (measured at 2% in water at 20° C using the Hoppler viscosity meter) of 365 cP. The aqueous solution of the product was clear, the insoluble portion amounted to 0.8% (centrifuge method). The strength of the sodium monochloroacetate (MCANa) is 61%.

EXAMPLE 2

15 parts of ground pine sulphite cellulose, 15.25 parts of 48% strength sodium hydroxide solution, 20.3 parts of monochloroacetate and 181 parts of 87% strength aqueous isopropanol (azeotropically boiling mixture) were admitted hourly into the mashing vessel. Further processing was carried out as in Example 1. The CMC-product obtained had a DS value of 1.20, the viscosity was 4,620 cP, the residual values were less than 1%, the aqueous solution was clear, the MCANa strength is 60%.

EXAMPLE 3

15 parts of beech sulphite cellulose, 13.25 parts of 33% strength sodium hydroxide solution, 10.65 parts of monochloroacetate and 172 parts of 85% strength aqueous isopropanol were reacted hourly as described in the previous examples. The pure CMC obtained had a DS value of 0.79 and the viscosity was 680 cP. The residues were less than 1%, the aqueous solution was clear. MCANa strength = 75.2%. The pre-alkalisation in a "dry process" in suitable mixers is preferred when a ripeness of the alkali cellulose is required for low viscosity types of CMC.

The reaction tubes may be equipped with heating or cooling jackets in such a manner that it is possible to heat or to cool each pipe in two halves with different temperatures. In the case of cascade arrangement of two or three pipes the last tube for example, may be used entirely or partly (up to a half) for cooling the reaction product. This can be advantageous for working up the crude product. The strengths of the etherification agent MCANa are excellent at 60 – 75% depending on the DS value.

What is claimed is:

1. In the process for the continuous manufacture of cellulose glycolate, in which an etherification mixture, initially containing alkali cellulose formed from finely comminuted cellulose and sodium hydroxide solution, sodium chloroacetate and water is conveyed through a reaction zone having a constant temperature of at least 60° C and when said zone has more than one section, a constant temperature in each section, in a manner such that the residence time of the etherification mixture in the reaction zone is sufficient to cause the sodium chloroacetate initially contained in the mixture to react, and in which the etherification mixture is also thoroughly mixed by the application of shearing forces;

the improvement comprising that the etherification mixture initially comprises 1 part by weight of cellulose 0.2 to 0.6 part by weight of sodium hydroxide 0.5 to 1.75 part by weight of sodium monochloroacetate 7 to 22 parts by weight of isopropyl alcohol (100%) and water corresponding to between 20% and 50% by weight of the isopropyl alcohol, maintaining the constant temperature of the etherification mixture in the reaction zone in the range of 60° to 90° C, exerting the shearing forces on the etherification mixture before it enters the reaction zone and at a temperature below 30° C, by homogenizing by means of a homogenizer, the residence time of the etherification mixture in the homogenizing zone being less than 1/10 of its residence time in the reaction zone, and, after etherification has terminated, separating the fluid components from the solid components of the etherification mixture by mechanical means.

2. A process as claimed in claim 1, including passing the mixture through the mixing zone at a rate more than 10 times the rate at which it passes through the reaction zone, whereby excess mixture passing through the mixing zone is recirculated to the mixing zone.

3. A process as claimed in claim 1, including passing the mixture through two mixing zones in series.

4. A process as claimed in claim 1, including recycling the separated liquid components from the reaction mixture, after etherification, to the mixing zone for use as components for the manufacture of the initial etherification mixture.

5. A process as claimed in claim 1 including maintaining the constant temperature of the etherification mixture in the reaction zone in the range of 70° to 85° C.

* * * * *